United States Patent [19]

Theriot

[11] 4,231,279
[45] Nov. 4, 1980

[54] ADAPTIVE WASHER AND BOLT ASSEMBLY

[76] Inventor: Joseph E. Theriot, P.O. Box 766, Houma, La.

[21] Appl. No.: 922,838

[22] Filed: Jul. 10, 1978

[51] Int. Cl.$^3$ ............................................. F16B 43/00
[52] U.S. Cl. ..................................... 85/9 R; 85/50 R
[58] Field of Search ............ 85/50 R, 28, 1 JP, 9 R, 85/9 W, 1 R, 4; 40.3/408; 52/DIG. 6; 151/35; 151/44, 55, 54, 45

[56] References Cited

U.S. PATENT DOCUMENTS

| | | | |
|---|---|---|---|
| 2,234,667 | 3/1941 | D'Amico | 85/1 R |
| 2,286,950 | 6/1942 | Breedlove | 85/32 R |
| 3,370,631 | 2/1968 | James | 151/37 |
| 4,018,111 | 4/1977 | Goldhaber | 85/50 R X |

FOREIGN PATENT DOCUMENTS

| | | | |
|---|---|---|---|
| 103274 | 5/1926 | Austria | 85/50 R |
| 347551 | 1/1922 | Fed. Rep. of Germany | 403/408 |

*Primary Examiner*—Ramon S. Britts
*Attorney, Agent, or Firm*—Keaty & Garvey

[57] ABSTRACT

An adaptive washer assembly comprises a washer body which provides an inner flat surface which is abuttable against a base structure such as a timber bridge member to which a conventional bolt and the attached washer body will be attached in for example, timber construction. The washer body is provided with an outer curved surface, the outer surface and the inner face intersecting to form a periheral edge portion to said washer body. In the preferred embodiment, the washer body is thicker at the center portion thereof, and a substantially cylindrical bore is provided through the washer body at the thickened central portion thereof. The central bore can be provided with a diameter substantially equal to or larger than the diameter of the shaft portion of the bolt to be attached through the washer bore to the base structure which could be, for example, a wooden timber member. A bolt head recess provided on the washer body adjacent to the curved outer surface and communicating with the central bore is capable of protectively housing the bolt head portion of the conventional bolt with the uppermost surface portion of the bolt head being protected and substantially flush with the outer curved surface of the washer body. The adaptive washer provides a combined connection with conventional hex head bolts for situations where protruding heads are undesirable or dangerous.

11 Claims, 9 Drawing Figures

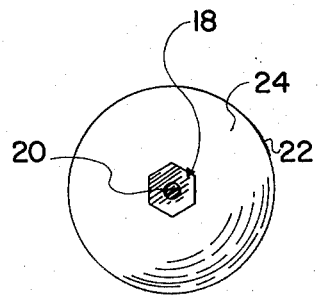
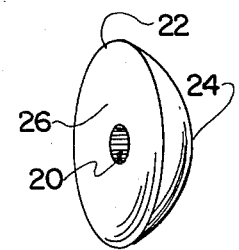
FIGURE 5  FIGURE 8
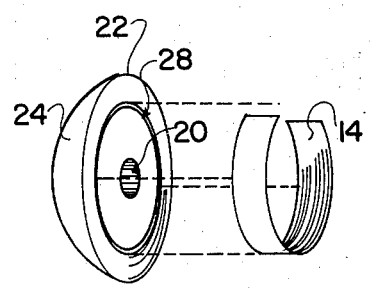
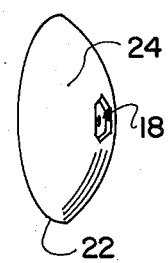
FIGURE 6  FIGURE 7
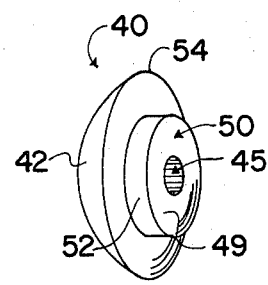
FIGURE 9

ADAPTIVE WASHER AND BOLT ASSEMBLY

Background of the Invention

1. Field of the Invention

The present invention relates to structural connections, especially bolted connections in an application using metallic or like rigid structural bolts connecting timber base structural members together to form structures such as wood bridges and the like. Even more particularly, the present invention relates to adaptive metallic or like rigid washers which can be combined with conventional bolts to form an overall connection which lessens the stress between the bolt connection and the timber member to which it is affixed.

2. General Background and Prior Art

In the construction of wooden bridges and other wooden type structures, creosote timber members such as piling, beams, columns, and the like are usually connected by means of a bolted connection using an elongated tensile fastener which can be, for example, a threaded bolt. The wooden member or members are connected by placing the bolt through a hole which is milled or formed by drilling through the wooden member itself.

A problem arises since the metal connector or bolt is quite hard, and can cut into the wooden member thereby destroying it, or at least weakening the overall integrity of the structure itself by allowing the connection to become loose as portions of the wooden beam or like member are chipped away.

A further problem is seen in structures where protruding portions of the bolted connections are dangerous or undesirable. This is usually the case where sparks caused by a contact of metal against metal can cause explosions or fire if volatile fuels are in the area. This particular problem is seen when a wooden bridge is frequently passed by metal barges containing volatile materials. If the barge butts up against the bridge structure and begins scraping against a metal bolt head for example, a tremendous number of sparks could eventually be generated increasing the likelihood of a catastrophic explosion or fire.

Bolt heads are known in the art which are recommended for use in timber where protruding heads or protruding metal is dangerous or undesirable due to the production of sparks. Jersey Bolt manufactures a variety of wrought iron or steel hardware wherein the bolt heads are available with large diameter heads. For example, a bolt having a 1 inch diameter shaft could be provided with as much as a 3 inch diameter bolt head.

These are generally referred to in the industry as "dome head" bolts. They are provided by Jersey Bolt of Bayonne, New Jersey in sizes of, for example, ½ inch with a 2 inch diameter head, 1 inch with a 3 inch diameter head, 1¼ inch with a 3½ inch diameter head, and similar known sizes.

Such dome head bolts are quite specific in their use and are expensive items for a distributor or manufacturer to carry in stock since the call for them can be quite restricted.

On the other hand, conventional bolts such as hex head bolts or square head bolts, which are well supplied and well stocked in the industry, are not suitable for use in timber constructions since their heads are generally of a small size which is insufficient to distribute the bearing and shear stresses generated by a typical bolt and timber connection.

Thus, there is a need to provide a simple and inexpensive connection to the end portion of a bolt where a connection can be formed between a bolt and a wooden member which connection properly distributes both bearing and shear stresses.

Such a connection must not only properly distribute the bearing and shear stresses generated in a typical bolt and timber connection, but must likewise be able to solve the problem of spark reduction in cases where protruding bolt heads are either dangerous or undesirable.

Several devices have been patented which attempt to solve the problem of rigid or metal connections with wood. The following table lists several such devices which have been patented.

| Prior Art Patents | | |
|---|---|---|
| U. S. Pat. No. | Inventor(s) | Issue Date |
| 797,545 | Ette | 8-15-1905 |
| 88,632 | Hooper | 4-6-1869 |
| 777,192 | Ette | 12-13-1904 |
| 888,982 | Ette | 5-26-1908 |
| 1,350,139 | Clopton | 8-17-1920 |
| 2,980,155 | Waller | 4-18-1961 |
| 759,599 | Ette | 5-10-1904 |
| 2,046,949 | Horner | 7-7-1936 |
| 1,719,136 | Rosenberg | 7-2-1929 |

3. General Description of the Present Invention

The present invention solves all these prior art problems and shortcomings by providing a simple and inexpensive adaptive washer which can be connected to and combined with any conventional common bolt such as a hexagonal head or square head bolt as is easily available and well known in the industry.

The present invention provides an adaptive washer which is comprised of a washer body providing an inner face which is abuttable against a timber base structure to which a conventional bolt and the washer body will be attached. The inner face provides an increased surface area for the distribution of bearing surfaces from the bolt to the wooden structure thereby reducing the cutting forces of the bolt head into the timber which can lead to eventual damage to the timber and the entire structure itself.

The washer body is provided with a curved outer surface, the curved outer surface and the inner face intersecting to form a peripheral edge portion which meets with the timber structure to which the bolt and washer assembly are attached. In the preferred embodiment, the washer body is thickened at the center portion being substantially hemispherical in shape. A substantially cylindrical central bore provides an opening through the washer body, the bore having a diameter substantially equal to or larger than the diameter of the shaft portion of the conventional bolt to be attached through the washer bore and to the base structure. A bolt head recess is provided on the washer body adjacent to the curved outer surface and communicating with the central bore. The bolt head recess receivably and protectively houses the bolt head portion of the conventional bolt with the uppermost surface portion of the bolt head being substantially flush with the curved surface. Thus, the completed connection "shows" only a curved, tapered, head which solves all the problems of the prior art connectors while at the same time providing an adaptive structure which can be combined with any common conventional bolt such as a hex head or square head type bolt.

Shear can be distributed properly from the adaptive bolt washer of the present invention to the timber structure to which it is attached by the use of an annular split ring which is connected in part to the inner face portion of the washer and in part to a corresponding recess cut into the timber structure itself. In an alternative embodiment, an anti-shear protruding inner head portion registers with a similarly shaped recess which is milled into the timber structure.

A second alternative embodiment provides an adaptive washer which is substantially entirely flush with the timber structure itself.

In each embodiment, a recess is provided for protectively and receivably housing the head portion of the conventional hex head or square head bolt.

Brief Description of the Drawings

For a further understanding of the nature and objects of the present invention, reference should be had to the following detailed description, taken in conjunction with the accompanying drawings, in which like parts are given like reference numerals and wherein:

FIG. 5 is a top view of the preferred embodiment of the apparatus of the present invention;

FIG. 6 is a perspective exploded view of the preferred embodiment of the apparatus of the present invention;

FIG. 7 is a perspective frontal view of the preferred embodiment of the apparatus of the present invention;

FIG. 8 is a perspective rear view of the preferred of the apparatus of the present invention with the split ring portion thereof not shown; and FIG. 9 is a rear perspective view of the first alternative embodiment of the apparatus of the present invention.

DETAILED DESCRIPTION OF THE PREFERRED EMBODIMENT

Figure 1:
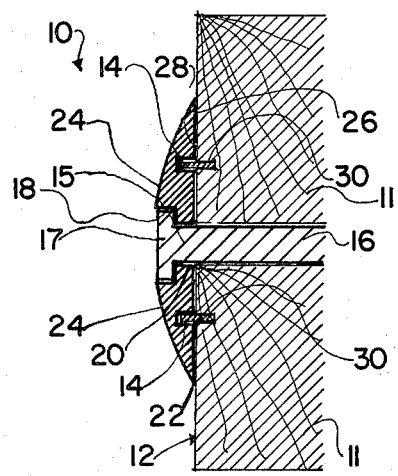
FIG. 1 is a sectional view of the preferred embodiment of the apparatus of the present invention.

FIGS. 1, 6, 7, and 8 illustrate the detailed construction of the preferred embodiment of the apparatus of the present invention. In FIG. 1 there is provided an adaptive washer 10 which provides an outer curved surface 24 and an inner flat surface 26 which can be attached to the surface 12 of the wooden structure 11 such as a bulkhead, piling, or like member as is experienced often in the construction of wooden bridges and like structures for example. Note in FIG. 1 that curved surface 24 and inner flat surface 26 of washer 10 meet at a peripheral edge 22. Note from an inspection of FIGS. 5, 7, and 1 that a hexagonal recess 18 is provided in washer 10 which protectively houses the head portion 17 of a typical conventional bolt 16. In the preferred embodiment, the recess 18 illustrated and shown is hexagonal. It should be understood, however, that similar shapes could be provided for octagonal or squareheaded bolts within the teaching of the present invention. An annular opening 20 is provided through washer 10 for the passage of a bolt shaft 15 as can be seen in FIG. 1.

Adaptive washer 10 provides an enlarged surface area to reduce the bearing stress of the bolt head to the surface 12 of wooden structure 11. Such as enlarged and spread area preserves the structural integrity of the wood at the bolt 16 and wooden structure 11 connection. The bearing stress of washer 10 against wooden structure 11 will be transmitted from bolt head 17 to washer 10 and surface 26.

A shear ring which can be, for example, a split ring connector is provided. Split ring 14 can best be seen in FIGS. 1 and 6. In the preferred embodiment, a split ring connector is shown which can be manufactured, for example, of wrought iron or steel. The split ring connector could be manufactured in a variety of desirable shapes and sizes. A typical example of a suitable split ring connector is a connector as manufactured by Jersey Bolt of Bayonne, New Jersey. surface 50. Projection 49 can be connected integrally with washer 40 and thus forms a projecting shear member which anchors washer 40 in the wooden structure 11 to which it is attached. For the proper attachment of washer 40 to wooden structure 11, a correspondingly sized and shaped annular recess 50 would be provided on wooden structure 11 to insure suitable connection.

Figure 2:
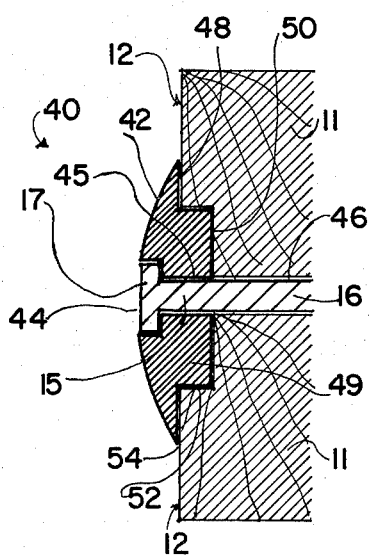
FIG. 2 is a sectional view of a first alternative embodiment of the apparatus of the present invention.

In FIG. 2 there can further be seen a recess 44 which can be, for example, a hexagonal recess as is illustrated in FIGS. 5 and 7 as was described more fully above. Recess 44 connects to a cylindrical bore or opening 45. The combination of hexagonal recess 44 and cylindrical bore 46 provide an opening through washer 40 into which a conventional bolt 16 can register with the bolt shaft 15 occupying the space of opening 45 and with bolt head 17 occupying recess 44. A corresponding opening 46 must be provided in wooden structure 11 for the attachment of bolt 16 and washer 40 thereto. It should be understood and should be clear to one skilled in the art that bolt member 16 would extend beyond the portion shown in FIG. 2 and extend through a wooden structure 11 such as a piling, bridge beam member, bridge column member, or like member as is known in the timber construction industry. When bolt 16 so protrudes through the timber structure 11 to which it is attached, a duplicate adaptive washer 40 could be provided at the opposite side, with a nut (not shown) corresponding to size and shape of head 17 likewise occupying a space within recess 44. In this manner the desired connection is completed. By applying rotational movement to the nut, while applying necessary pressure to the washer in order to prevent its rotation, tension can be applied to bolt 16 thus bringing each adaptive washer 10 into a tight face-to-face relationship with the base structure 11 as is desirable. A torque wrench or like device for measuring the amount of torque applied to the nut (not shown), and thus the tension developed within a bolt 16 could be used to effect such a suitable connection.

Note from an inspection of FIGS. 1 and 6 that an annular corresponding recess 28 is provided on washer 10 for the attachment of a portion of split ring 14 thereto. In FIG. 1 there can be seen a corresponding recess 30 which has been milled into the wooden structure 11 which can be, for example, a piling, bridge timber member, or like structure surface.

The overall structure shown in FIG. 1 provides an improved washer which can be used with a conventional bolt, and would especially be used in situations where bolts served as connectors with timber and where protruding heads are dangerous or undesirable.

In the embodiment shown in FIG. 1, the shear ring 14 would disallow or retard slippage of bolt washer 10 and its attached bolt 16 in a shearing direction parallel to and along the face 12 of wooden structure 11.

Figure 3:
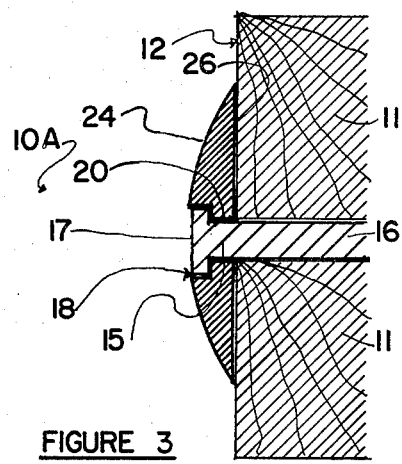
FIG. 3 is a sectional view of the embodiment illustrated in FIG. 1 with the "split ring" portion thereof removed.

In FIG. 3 there can be seen a bolt washer 10A with the split ring omitted, for use in situations where a shear ring 14 is undesirable or unnecessary.

In FIG. 3, there can be seen a structure similar in overall construction to the washer 10 described in FIG. 1. Note, however, that split ring 14 in its corresponding recess 28 have been omitted from the embodiment shown in FIG. 3.

FIG. 2 illustrates a first alternative embodiment of the apparatus of the present invention. In FIG. 2 there is seen a bolt adaptive washer 40 which is provided with an outer curved substantially smooth surface 42 and an inner flat surface 48 which can abut a desired wooden structure 11 as will be described more fully hereinafter. Note that the embodiment shown in FIG. 2 is provided with a projection member 49 which is substantially cylindrical in shape having a peripheral annular curved sidewall 52 and an inner flat FIG. 8 illustrates a perspective view of washer 40 more particularly showing the cylindrical annular projection 49 having an inner flat surface 50 and a curved sidewall 52.

Figure 4:
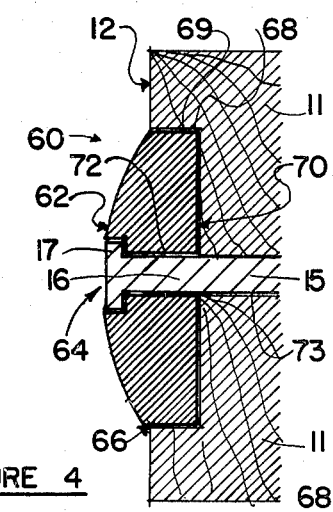
FIG. 4 is a sectional view of a second alternative embodiment of the apparatus of the present invention.

FIG. 4 illustrates a second alternative embodiment of the apparatus of the present invention. In FIG. 4 there is seen an adaptive washer 60 which can be used for the attachment of a conventional bolt 16 to a wooden structure 11 such as a bridge timber, wooden piling, or the like. In the embodiment shown in FIG. 4, an annular recess 68 would be provided in wooden structure 11 by milling or similar process known in the art.

Washer 60 is substantially annular in shape having an annular sidewall 69, an outer curved surface 62, and an inner flat surface 70.

A recess 64 is provided which can be, for example, hexagonal as was illustrated in FIG. 5 with respect to the preferred embodiment. Likewise, an opening 72 in washer 60 is provided with a corresponding opening 72 provided in wooden structure 11. Openings 72 and 73 provide an annular opening into which the shaft portion 15 of bolt 16 can pass and form an attachment to wooden structure 11. The head portion 17 of bolt 16 occupies the hexagonal recess 64 as was aforementioned with respect to the preferred embodiment and to the first alternative embodiment of the present invention.

Washers 10, 10A, 40, and 60 are all washers of a construction which allow the attachment of a conventional hexagonal head or like bolt to a timber member where protruding heads are dangerous or undesirable. Each washer provides a curved outer surface which tapers toward the wooden structure 11 to which it is attached, with no open edges being provided so that a moving structure such as a boat, for example, barge, or the like, could hang up on the adaptive washer causing sparks, or damage to the vessel or to the bridge itself.

In FIG. 1, the preferred embodiment of the present invention provides a washer 10 which has an outer curved surface 24 terminating at a peripheral edge 22 which is flush with and abutting against the surface 12 of the wooden structure 11 to which it is attached. Note that the connection provides a smooth overall connection of bolt 16 to wooden structure 11 thus negating or limiting the chance for damage due to a protruding bolt head.

In FIGS. 2-4. similar constructions have been taught which likewise provide an outer smoothed curved surface 24, 42, and 62 and a hexagonal or like-shaped recess cut thereinto for the "hiding" in a protective fashion of the head portion 17 of a conventional hexagonal, for example, bolt.

The embodiment shown in FIG. 1 illustrates a particular type of attachment which provides a shear ring 14 lessening the chance for damage in the event that the entire assembly of washer 10 and bolt 15 are abutted by an object which generates high shear forces. Similar shear forces are distributed by the washer 40 which provides a projection 49. Likewise, the washer 60 illustrated in FIG. 4 provides a structure which better distributes shear forces which could be transmitted to the combined assembly of washer 60 and bolt 16.

In FIG. 3 there is seen a washer 10A which in combination with bolt 16 provides an overall structure which reduces the chance of damage due to the connection, structure to which it is attached, or to the vessel or like moving structure which might come in contact with the assembly of washer 10A and bolt 16. Washer 10A does not provide the shear connections illustrated in FIGS. 1, 2 and 4, but provides an overall structure which can be used to attach a conventional bolt 16 to a wooden structural element without the need of milling to complete the attachment.

What is claimed as invention is:

1. An adaptive washer and bolt assembly comprising:
    a. a bolt having a non-circular bolt head portion mounted on a cylindrical bolt shaft;
    b. a rounded washer body providing an inner flattened face abuttable against a base structure to which said bolt and said washer body will be attached, said washer body having a rounded outer surface, said outer rounded surface and said inner flattened face intersecting at the outer edge of said rounded washer body to form a peripheral circular edge portion to said washer body;
    c. A substantially cylindrical central bore providing an opening through said washer body, said bore having a diameter substantially equal to or larger than the diameter of said bolt shaft; and
    d. a non-circular bolt head recess being correspondingly sized to conform to the size of said bolt head, said bolt head registering with said recess, said recess being provided on said washer body adjacent said curved outer surface and communicating with said central bore, said bolt head recess receivably and protectively housing said bolt head, with the uppermost surface portion of said bolt head being substantially flush with said curved outer surface.

2. The adaptive washer of claim 1 wherein said peripheral edge portion of said washer substantially contacts the surface of the base structure to which the said bolt and said washer body are attached.

3. The adaptive washer of claim 1 wherein said bolt head recess is a hexagonal recess.

4. The adaptive washer of claim 1 further comprising shear ring means connectable to said inner face portion of said washer body and to the base structure to which said washer body will be attached for retarding movement of said washer body in a direction generally along and parallel to the base structure to which said washer body will be attached.

5. The adaptive washer of claim 1 wherein said central bore is oriented perpendicularly to said inner face of said washer body.

6. The adaptive washer of claim 1 further comprising projection means connected to and protruding from said inner face portion of said washer body for retarding movement of said washer body in a direction parallel to and along the base structure to which said washer body will be attached.

7. The adaptive washer of claim 1 further comprising fastening means associated with said washer body and said conventional bolt attached thereto for urging said washer body and said attached bolt into face-to-face bearing connection with the base structure to which said washer body and said bolt are attached.

8. The adaptive washer of claim 7 further comprising antishear means connectable to and projecting from said interface portion of said washer body for retarding movement of said washer body in a direction parallel to and along the base structure to which said washer body is attached.

9. An adaptive washer and bolt assembly comprising:
 a. a bolt having a non-circular bolt head portion mounted on a cylindrical bolt shaft;
 b. a round washer body providing an inner face abuttable against a base structure to which said bolt and said washer body can be attached, said washer body having a curved outer surface, said outer surface and said inner face intersecting to form a round peripheral edge portion to said washer body, said peripheral edge portion of said washer body substantially contacting the surface of the base structure to which said bolt and said washer body are attached;
 c. a substantially cylindrical central bore providing an opening through said washer body, said bore having a diameter substantially equal to or larger than the diameter of said bolt shaft, and said central bore is oriented perpendicularly to said inner face of said washer body;
 d. a non-circular bolt head recess provided on said washer body adjacent said curved outer surface and communicating with said central bore, said bolt head recess receivably and protectively housing said bolt head with said bolt head and said recess being of compementary non-circular configurations
 e. projection means connected to and protruding from said inner face portion of said washer body for retarding movement of said washer body in a direction parallel to and along the base structure to which said washer body and said bolt will be attached; and
 f. fastening means associated with said washer body and said bolt attached thereto for urging said washer body and the attached bolt into a face-face bearing connection with the base structure to which said washer body and said bolt are attached.

10. The adaptive washer of claim 9 wherein said projection means is comprised of a shear ring connectable to said inter face portion of said washer body and to the base structure to which said washer body will be attached.

11. The adaptive washer of claim 9 wherein said projection means is a substantially cylindrical annular projection provided substantially over the entire surface of said inner face.

* * * * *